(12) United States Patent
Basham et al.

(10) Patent No.: US 7,996,509 B2
(45) Date of Patent: Aug. 9, 2011

(54) ZONING OF DEVICES IN A STORAGE AREA NETWORK

(75) Inventors: Robert Beverley Basham, Aloha, OR (US); Andrew Gary Hourselt, Tucson, AZ (US); Kelly Louise McWaters, Tucson, AZ (US); Ashaki Ayanna Ricketts, Tucson, AZ (US); Teresa Shen Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/861,684

(22) Filed: Sep. 26, 2007

(65) Prior Publication Data

US 2009/0083423 A1     Mar. 26, 2009

(51) Int. Cl.
*G06F 15/173* (2006.01)

(52) U.S. Cl. ........ 709/223; 709/224; 709/225; 710/300; 710/36; 711/100

(58) Field of Classification Search .......... 709/223–227; 710/300–317, 2, 8–10, 15–17, 36–38; 711/100–115; 370/254, 386, 389
See application file for complete search history.

(56) References Cited

U.S. PATENT DOCUMENTS

| | | | | |
|---|---|---|---|---|
| 6,108,684 | A  * | 8/2000  | DeKoning et al. | 718/105 |
| 6,640,278 | B1 * | 10/2003 | Nolan et al. | 711/6 |
| 6,754,718 | B1   | 6/2004  | Dobberpuhl et al. | |
| 6,765,919 | B1 * | 7/2004  | Banks et al. | 370/401 |
| 6,839,746 | B1 * | 1/2005  | Muthiyan et al. | 709/220 |
| 7,003,527 | B1 * | 2/2006  | Lavallee et al. | 1/1 |
| 7,103,653 | B2   | 9/2006  | Iwatani | |
| 7,107,328 | B1 * | 9/2006  | Muthiyan et al. | 709/220 |
| 7,209,967 | B2 * | 4/2007  | Kitamura | 709/225 |
| 7,376,898 | B1 * | 5/2008  | Yehuda et al. | 715/741 |
| 7,377,800 | B2 * | 5/2008  | Gasser | 439/374 |
| 7,437,462 | B2 * | 10/2008 | Marks et al. | 709/226 |
| 7,437,753 | B2 * | 10/2008 | Nahum | 726/4 |
| 7,454,437 | B1 * | 11/2008 | Lavallee et al. | 1/1 |
| 7,469,284 | B1 * | 12/2008 | Dubrovsky et al. | 709/223 |
| 7,506,040 | B1 * | 3/2009  | Rabe et al. | 709/223 |

(Continued)

OTHER PUBLICATIONS

Liao et al.; Managing Access Control Though SAS Zoning; Mar. 16, 2006; http://web.archive.org/web/20060316082553/http://www.analogzone.com/iot_0102.pdf.*

(Continued)

*Primary Examiner* — Rupal D Dharia
*Assistant Examiner* — Jimmy H Tran
(74) *Attorney, Agent, or Firm* — Stephen R. Tkacs; Stephen J. Walder, Jr.; Matthew Zehrer

(57) ABSTRACT

Mechanisms for performing zoning of devices, such as Serial Attached SCSI (SAS) devices, for example, in a storage area network (SAN) in which all host systems of the SAN are automatically mapped to all of the storage systems are provided. Mechanisms for automatically mapping backend storage enclosures to appropriate storage system controllers on the SAN are provided. The zoning is automatically performed based on whether ports/phys are coupled to host systems, storage systems, and whether there are storage system controllers associated with the storage systems. Based on the automatic zoning, mapping of the storage devices of the storage systems to the host systems may be automatically performed via zone permission tables. By automating the zoning, users that do not necessarily have a detailed knowledge of the storage device communication protocol or SANs may configure the SAN even if it utilizes a complex and large architecture.

21 Claims, 7 Drawing Sheets

U.S. PATENT DOCUMENTS

| | | | |
|---|---|---|---|
| 7,533,169 B1* | 5/2009 | Gold et al. | 709/224 |
| 7,644,304 B2* | 1/2010 | Kotzur et al. | 714/7 |
| 7,730,252 B2* | 6/2010 | Odenwald et al. | 710/300 |
| 7,734,712 B1* | 6/2010 | Meyer et al. | 709/213 |
| 7,818,536 B1* | 10/2010 | Todd et al. | 711/206 |
| 2002/0110125 A1* | 8/2002 | Banks et al. | 370/392 |
| 2002/0176434 A1* | 11/2002 | Yu et al. | 370/422 |
| 2003/0055932 A1* | 3/2003 | Brisse | 709/223 |
| 2003/0149763 A1* | 8/2003 | Heitman et al. | 709/224 |
| 2003/0212711 A1 | 11/2003 | Fujibayashi et al. | |
| 2003/0229689 A1 | 12/2003 | Raghavan et al. | |
| 2004/0010600 A1 | 1/2004 | Baldwin et al. | |
| 2004/0039756 A1 | 2/2004 | Bromley | |
| 2004/0078599 A1* | 4/2004 | Nahum | 713/201 |
| 2004/0205259 A1* | 10/2004 | Galloway | 710/3 |
| 2005/0036499 A1* | 2/2005 | Dutt et al. | 370/401 |
| 2005/0080881 A1* | 4/2005 | Voorhees et al. | 709/220 |
| 2005/0091353 A1* | 4/2005 | Gopisetty et al. | 709/223 |
| 2005/0185599 A1* | 8/2005 | Clayton | 370/254 |
| 2005/0267950 A1* | 12/2005 | Kitamura | 709/219 |
| 2006/0031443 A1* | 2/2006 | Carpenter et al. | 709/223 |
| 2006/0059307 A1* | 3/2006 | Fujibayashi | 711/114 |
| 2006/0101171 A1* | 5/2006 | Grieff et al. | 710/36 |
| 2006/0171384 A1* | 8/2006 | Graves | 370/389 |
| 2006/0184650 A1* | 8/2006 | Abali et al. | 709/220 |
| 2006/0184760 A1* | 8/2006 | Fujibayashi et al. | 711/170 |
| 2006/0230218 A1* | 10/2006 | Warren et al. | 710/315 |
| 2007/0058619 A1* | 3/2007 | Gopal Gowda et al. | 370/386 |
| 2007/0088974 A1* | 4/2007 | Chandwani et al. | 714/6 |
| 2007/0094472 A1* | 4/2007 | Marks et al. | 711/170 |
| 2007/0162592 A1* | 7/2007 | Marks et al. | 709/224 |
| 2007/0165660 A1* | 7/2007 | Fang et al. | 370/410 |
| 2007/0220204 A1* | 9/2007 | Nakajima et al. | 711/114 |
| 2007/0223517 A1* | 9/2007 | Warren et al. | 370/463 |
| 2008/0028042 A1* | 1/2008 | Bealkowski | 709/219 |
| 2008/0028045 A1* | 1/2008 | Bealkowski | 709/219 |
| 2008/0114931 A1* | 5/2008 | Aoki | 711/114 |
| 2008/0120687 A1* | 5/2008 | Johnson | 726/1 |
| 2008/0126631 A1* | 5/2008 | Bailey et al. | 710/74 |
| 2008/0126849 A1* | 5/2008 | Kotzur et al. | 714/7 |
| 2008/0133865 A1* | 6/2008 | Qi et al. | 711/170 |
| 2009/0037565 A1* | 2/2009 | Andresen et al. | 709/222 |

OTHER PUBLICATIONS

Tim Symons et al.; SAS-2 Port and Address-based Zoning; Sep. 2006; http://www.pmc-sierra.com/sas6g/doc/sas-2_port_addresszoning_wp_01_sas6g.pdf.*

Tim Symons; Evoluation of SAS; Apr. 2007.*

U.S. Appl. No. 11/859,867, filed Sep. 24, 2007, Basham et al.

* cited by examiner

FIG. 3

| ZONE GROUP | CONFIGURABLE IN ZONE PERMISSION TABLE [a] | DESCRIPTION |
|---|---|---|
| 0 | NO | PHYS IN ZONE GROUP 0 HAVE ACCESS TO PHYS IN ZONE GOUP 1 AND DO NOT HAVE ACCESS TO PHYS IN OTHER ZONE GROUPS. |
| 1 | NO | PHYS IN ZONE GROUP 1 HAVE ACCESS TO PHYS IN ALL ZONE GOUPS. |
| 2 | YES | PHYS IN ZONE GROUP 2 HAVE ACCESS TO PHYS IN THE ZONE GROUPS INDICATED BY THE ZONE PERMISSION TABLE.<br><br>A MANAGEMENT DEVICE SERVER IN A SAS EXPANDER DEVICE WITH ZONING ENABLED ONLY ALLOWS MANAGEMENT APPLICATION CLIENTS USING PHYS IN ZONE GROUPS WITH ACCESS TO ZONE GROUP 2 TO PERFORM THE FOLLOWING SMP FUNCTIONS:<br>a) CONFIGURE GENERAL<br>b) ENABLE DISABLE ZONING; AND<br>c) ZONE LOCK<br><br>A MANAGEMENT DEVICE SERVER IN A SAS EXPANDER DEVICE WITH ZONING ENABLED ONLY ALLOWS MANAGEMENT APPLICATION CLIENTS TO PERFORM CERTAIN SMP PHY-BASED CONTROL AND CONFIGURATION FUNCTIONS (e.g., PHY CONTROL, PHY TEST FUNCTION, AND CONFIGURE PHY EVENT INFORMATION) IF THE ZONE GROUP OF THE MANAGEMENT APPLICATION CLIENT'S PHY HAS ACCESS TO ZONE GROUP 2 OR THE ZONE GROUP OF THE SPECIFIED PHY. |
| 3 | YES | PHYS IN ZONE GROUP 3 HAVE ACCESS TO PHYS IN THE ZONE GROUPS INDICATED BY THE ZONE PERMISSION TABLE.<br><br>A MANAGEMENT DEVICE SERVER IN A SAS EXPANDER DEVICE WITH ZONING ENABLED ONLY ALLOWS MANAGEMENT APPLICATION CLIENTS USING A PHY IN A ZONE GROUP WITH ACCESS TO ZONE GROUP 3 TO PERFORM CERTAIN SMP ZONING-RELATED FUNCTIONS (i.e., ZONED BROADCAST). |
| 4 TO 7 | RESERVED | |
| 8 TO 127 | YES | PHYS IN ZONE GROUPS 8 THROUGH 127 HAVE ACCESS TO PHYS IN THE ZONE GROUPS INDICATED BY THE ZONE PERMISSION TABLE. |

| DESTINATION ZONE GROUP (i.e., d) | SOURCE ZONE GROUP (i.e., s) | | | | |
|---|---|---|---|---|---|
| | 0 | 1 | 2 TO 3 | 4 TO 7 | 8 TO 127 |
| 0 | 0 | 1 | 0 | 0 | 0 |
| 1 | 1 | 1 | 1 | 1 | 1 |
| 2 TO 3 | 0 | 1 | ZP[s = 2 TO 3, d = 2 TO 3] [a] | RESERVED [b] | ZP[s = 8 TO 127, d = 2 TO 3] [a] |
| 4 TO 7 | 0 | 1 | RESERVED [b] | RESERVED [b] | RESERVED [b] |
| 8 TO 127 | 0 | 1 | ZP[s = 2 TO 3, d = 8 TO 127] [a] | RESERVED [b] | ZP[s = 8 TO 127, d = 8 TO 127] [a] |

[a] SHADING IDENTIFIES CONFIGURABLE ZONE GROUPS.
[b] ALL RESERVED ZP BITS SHALL BE SET TO ZERO
(e.g., BITS ZP[4 TO 7, 8 TO 127] ARE SET TO ZERO).

*FIG. 4*

ZONING OF DEVICES IN A STORAGE AREA NETWORK

BACKGROUND

1. Technical Field

The present application relates generally to an improved data processing system and method. More specifically, the present application is directed to a system and computer program product for one button zoning of devices, such as serial attached SCSI (SAS) devices, for example, in a storage area network (SAN).

2. Description of Related Art

Storage area networks, or SANs, consist of multiple storage devices connected by one or more fabrics. Storage devices can be of two types: host systems that access data, and storage subsystems that are providers of data. Zoning is a network-layer access control mechanism that dictates which storage subsystems are visible to which host systems. This access control mechanism is useful in scenarios where the storage area network is shared across multiple administrative or functional domains. Such scenarios are common in large installations of storage area networks, such as those found in storage service providers.

The current approach to zoning storage area networks is typically manual and involves correlating information from multiple sources to achieve the desired results. For example, if a system administrator wants to put multiple storage devices in one zone, the system administrator has to identify all the ports belonging to the storage devices, verify the fabric connectivity of these storage devices to determine the intermediate switch ports and input all this assembled information into the zone configuration utility provided by the fabric manufacturer. This manual process is very error-prone because storage device or switch ports are identified by a 48-byte hexadecimal notation that is not easy to remember or manipulate. Furthermore, the system administrator has to also do a manual translation of any zoning policy to determine the number of zones as well as the assignment of storage devices to zones.

Recently a new approach to zoning of Fibre Channel architecture based storage area networks has been devised in which automatic zoning of storage area networks (SANs) is performed based on system administrator defined policies. This mechanism is described in commonly assigned U.S. Patent Application Publication No. 2005/0091353 entitled "System and Method for Autonomically Zoning Storage Area Networks Based on Policy Requirements." With this mechanism, in a measurement phase of operation, configuration data and connectivity topology data is periodically collected from each of the devices in the SAN using software agents which are placed in every switch and host device in the SAN. The collected data is analyzed to determine relationships between the devices in the SAN. The information obtained from such an analysis is converted into a graph structure where each node is either a switch port or a storage device port. A zone plan is then generated based on the graph structure and system administrator established zoning policies. The generated zone plan is then provided to a system administrator for approval and, if approved, the zone plan is implemented in the SAN by programming the zoning plan onto individual switches included within the SAN.

One emerging technology that is being used more prevalently with storage area networks is Serial Attached SCSI (SAS) communication protocol technology. SAS is a computer bus technology primarily designed for transfer of data to and from devices such as hard drives, CD-ROM drives, tape storage devices, and the like. SAS is a serial communication protocol for direct attached storage (DAS) devices. It is designed for the corporate and enterprise market as a replacement for parallel SCSI, allowing for much higher speed data transfers than previously available, and is backwards-compatible with Serial Advanced Technology Attachment (SATA) drives. Though SAS uses serial communication instead of the parallel method found in traditional SCSI devices, it still uses SCSI commands for interacting with SAS end devices.

SAS zoning in a storage area network is particularly difficult. Typically, the SAS zoning is a two-step mapping process where each individual port, or "phy," is assigned to a zone group and then, as a subsequent step, each zone group is mapped to each of the host systems. SAS zoning is increasingly being targeted at users or customers that do not necessarily have storage area network knowledge or skills and thus, do not have the necessary background to perform the manual zoning of SAS based storage area networks. Thus, these users or customers require aids to help make the zoning of the storage area network easier.

However, SAS poses some unique zoning challenges that are not present in more conventional Fibre Channel architecture based SANs. For example, in Fibre Channel, defining a zone configuration is simply a matter of grouping ports into a "zone" such that all ports in the "zone" can see each other. SAS zoning, on the other hand, is a two-step process. It requires the user to group ports into a zone group but then a separate step is required for access. Another complexity is the limit on the number of zone groups that can be defined. The current limit is 128 but is moving up to 256. This means that certain techniques like assigning each initiator port to its own zone (a technique common in Fibre Channel zoning) will not work in larger SAS SANs. Another example of complexity is the manner in which SAS zoning boundaries (ZSPDS) are defined. For SAS, access to devices beyond the SAS domain zoning boundary is defined and allowed. Thus, it is a complex task to understand and comply with the rules for access in SAS SANs. For Fibre Channel, the zone graph ends at the zoning boundary, i.e. there is absolutely no access beyond that boundary.

Another emerging aspect of SAS that makes it more complex is that it resides inside and outside the server or blade system chassis. The SAS topology is not simply a graph of external nodes as in Fibre Channel. It is more hierarchical, with a mixture of internal and external nodes. Thus, any SAS zoning mechanism will have to accommodate the different rules for the portions of the SAS SAN within the server or blade system chassis and the portions that are external to the server or blade system chassis. Thus, Fibre Channel zoning mechanisms typically make use of a single, monolithic graph for managing the Fibre Channel based SAN. Such an approach cannot be applied to SAS SANs due to the various complexities mentioned above.

SUMMARY

In one illustrative embodiment, a computer program product comprising a computer useable storage medium having a computer readable program stored thereon is provided. The computer readable program, when executed on a zone manager in a Serial Attached SCSI (SAS) protocol subsystem of a storage area network (SAN), may cause the zone manager to automatically assign a host system of a chassis, in a storage area network (SAN) implementing a zoning protocol which comprises grouping and mapping components, to a first zone group of the SAN. The computer readable program may further comprise automatically assigning a second zone group of the SAN to a SAS storage device in the chassis and automatically mapping the assigned first zone group and the second zone group to each other such that the host system is mapped to the SAS storage device such that the host system is mapped to the SAS storage device by automatically updating a zone permissions table associated with one or more SAS expanders of the SAN. Communication between the host system and the SAS storage device may be controlled based on the mapping of the assigned first zone group to the assigned second zone group.

In another illustrative embodiment, a method is provided. The method may comprise various ones, and combinations of, the operations outlined above with regard to the computer program product illustrative embodiment.

In yet another illustrative embodiment, a zone manager system is provided. The zone manager system may comprise a processor and a memory coupled to the processor. The memory may comprise instructions which, when executed by the processor, cause the processor to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an exemplary table representing the various possible zone groups to which SAN devices may be associated in accordance with one illustrative embodiment;

FIG. 4 is an exemplary diagram of a zone permission table in accordance with one illustrative embodiment;

DETAILED DESCRIPTION OF THE ILLUSTRATIVE EMBODIMENTS

The illustrative embodiments provide a system, method, and computer program product for automatically performing zoning of devices in a storage area network (SAN). In the illustrative embodiments, zoning is performed with regard to a SAN that implements a zoning protocol which comprises grouping and mapping components, such as the Serial Attached SCSI (SAS) zoning protocol. For example, the zoning performed by the illustrative embodiments may be performed with regard to SAS devices within the SAN such that zone permission tables and other data structures of SAS expanders are configured based on this zoning. In order to provide a context for understanding the arrangement and operation of the illustrative embodiments, FIG. 1 is provided hereafter as one example of a SAN in which the mechanisms of the illustrative embodiments may be implemented.

It should be appreciated that while the illustrative embodiments will be described with regard to zoning of SAS devices using SAS expanders, the present invention is not limited to such. To the contrary, the mechanisms of the illustrative embodiments may be utilized with any SAN architecture and SAN devices in which zoning is utilized to control communication connection establishment and management between SAN devices. Since SAS is being utilized in the description of the illustrative embodiments, it is assumed that those of ordinary skill in the art are familiar with the SAS-2 standard promulgated by the Technical Committee T10. A copy of this standard is available at www.t10.org/ftp/t10/drafts/sas2/sas2r02.pdf.

Figure 1:
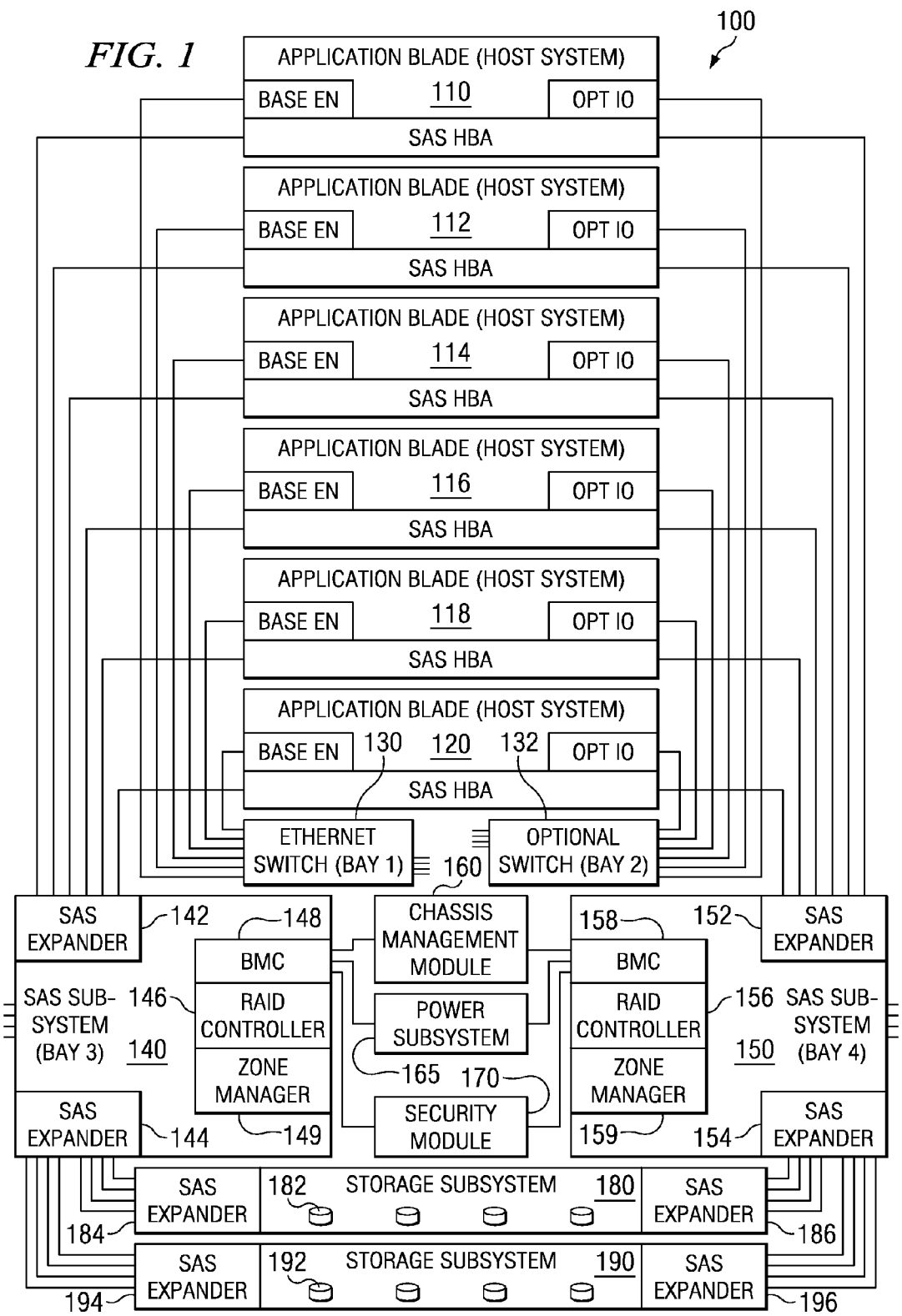
FIG. 1 is an exemplary diagram illustrating a tiered representation of a storage area network (SAN) in accordance with one illustrative embodiment.

With reference now to the figures, FIG. 1 is an exemplary diagram illustrating a storage area network (SAN) in accordance with one illustrative embodiment. As shown in FIG. 1, the SAN may be provided in a chassis 100, such as a Blade-Center™ chassis available from International Business Machines Corporation of Armonk, N.Y., or other type of blade chassis. Within the chassis 100, a plurality of host servers or host systems may be provided on application blades 110-120. Each host server 110-120 may have one or more input/output adapters including a base Ethernet (base EN) adapter for communication with an Ethernet switch 130, an optional I/O (opt I/O) adapter for communication with an optional switch 132, and SAS host bus adapter (SAS HBA) for communication with SAS subsystems 140 and 150. In addition to these elements, a chassis management module 160, power subsystem 165, and security module 170 may be provided within the chassis 100 for performing various management, power, and security functions. The elements of the chassis 100 communicate with one another via a SAN fabric.

The SAN fabric may include connections, such as wired links, wireless communication links, fiber optic cables, or the like. The SAN fabric may utilize one or more communication protocols including, for example, Fibre Channel, Ethernet, or the like. In the depicted example, the SAN fabric uses SAS to communicate between the application blades 110-120 and the storage subsystems 180 and 190 via the SAS subsystems 140 and 150. Fibre Channel is a high-speed transport technology used to build storage area networks (SANs). Although Fibre Channel can be used as a general-purpose network carrying ATM, IP, and other protocols, it has been primarily used for transporting SCSI traffic from servers to disk arrays. The Fibre Channel Protocol (FCP) serializes SCSI commands into Fibre Channel frames.

The SAS subsystems 140 and 150 operate as switches in the SAN fabric and controllers for accessing the storage subsystems 180 and 190. As shown in FIG. 1, the storage subsystems 180 and 190 are comprised of a plurality of storage devices 182 and 192, respectively, which are accessed via one or more SAS expanders 184, 186, 194, and 196. The storage devices 182 and 192 may comprise a single disk drive, tape drive, optical drive, or a plurality of such storage devices, such as in a disk array. For example, the storage subsystem 180 may comprise a disk array, such as a Redundant Array of Independent Disks (RAID) system with the disk devices in the RAID system being Just a Bunch of Disks (JBOD) devices and/or Switched Bunch of Disks (SBOD) systems.

The SAS subsystems 140 and 150 may themselves comprise a host side SAS expander 142, 152, and a storage subsystem side SAS expander 144, 154. The SAS expanders 142, 144, 152, 154, 184, 186, 194, and 196 operate in a manner similar to Ethernet hubs in a network which allows multiple systems to be connected using a single switch port. The SAS expanders 142, 144, 152, 154, 184, 186, 194, and 196 may be configured to support zoning in accordance with the illustrative embodiments. The SAS expanders 142, 144, 152, 154, 184, 186, 194, and 196 may be provided in one or more zoned portions of a service delivery subsystem (SAS zoning boundaries, i.e., ZPSDS). The SAS expanders 142, 144, 152, 154, 184, 186, 194, and 196 control whether a port, or phy, of a storage subsystem 180 or 190, or host system 110-120, is permitted to participate in a connection with another port, or phy, of another storage subsystem 180 or 190, or host system 110-120.

Moreover, the SAS subsystems 140 and 150 may further comprise storage subsystem controllers, such as RAID controllers 146 and 156, blade management controllers (BMC) 148 and 158, and at least one zone manager 149 and 159. While a plurality of zone managers 149 and 159 are shown in FIG. 1, it should be appreciated that only one zone manager, e.g., zone manager 149, may be actively managing the zones of the SAN at one time using the mechanisms of the illustrative embodiments, as described hereafter. The RAID controllers 146 and 156 perform various control operations for controlling operation and access to the storage subsystems 180 and 190. The BMCs 148 and 158 perform various management operations for managing the application blades 110-120 of the chassis 100. The BMCs 148 and 158 may communicate with the chassis management module 160 to obtain vital product data (VPD) for the various application blades 110-120 and storage subsystems 180 and 190.

Furthermore, the BMCs 148 and 158 may perform discovery operations for discovering the position, i.e. the bay or drawer identifier, of the various application blades 110-120, the SAS subsystems 140 and 150, switches 130 and 132, and storage subsystems 180 and 190. The BMCs 148 and 158 perform discovery of position information within the chassis 100 by using well known chassis communication techniques such that the SAS subsystem 140 and 150 obtains vital product data (VPD) which is filled in by the chassis management module 160. This VPD has information regarding the host servers, whether the host servers are powered on or not, and the like. As a result, the SAS subsystems 140, 150 knows the chassis id of the chassis 100 it is in, host servers 110-120 around the SAS subsystems 140, 150, storage devices in storage subsystems 180 and 190 on the chassis 100, and also which bay or drawer the SAS subsystem 140, 150 is in within the chassis 100. The BMC 148, 158 can then pass this information to the zone manager 149.

As shown in FIG. 1, the SAS subsystems 140 and 150, as well as the switches 130 and 132, have external ports for communicating with other devices outside of the chassis 100. These external devices may be part of the SAN as well, but may be provided in other chassis (not shown), coupled to the chassis 100 via an external data network (not shown), or the like. Discovery of the ports, or phys, associated with external data storage devices and host systems is generally covered in the SAS specification, revision 9, available from Technical Committee T10 at www.T10.org.

At the start of the zoning operation, the zone manager 149 of the SAN generates a list of ports, or phys, on the SAN, such as through the above discovery processes, and may further provide topology information, e.g., how the switches 130 and 132 are interconnected. During generation of this list of ports, or phys, the zone manager 149 determines which ports are associated with SAS end devices, i.e. storage devices or host system devices, that provide data storage, i.e. storage devices 182 and 192, which ports/phys are host systems, e.g., host servers on application blades 110-120, whether there are storage system controllers, e.g., RAID controllers 146 and 156, present in association with the end devices, and other hardware details. Therefore, a listing of host system ports and storage system ports/phys are both automatically available at the start of the operation of the mechanisms of the illustrative embodiments.

Additional information is available within the details of each port in each list. For example, the details for each port may identify whether the port is associated with a storage device that is part of an external Switched Bunch of Disks (SBOD) system, an internal Just a Bunch of Disks (JBOD) system, or the like. The zone manager 149 uses the information gathered in these lists through the discovery process to perform various zone management operations for automatically zoning the SAN in accordance with the illustrative embodiments as described hereafter.

Figure 2:
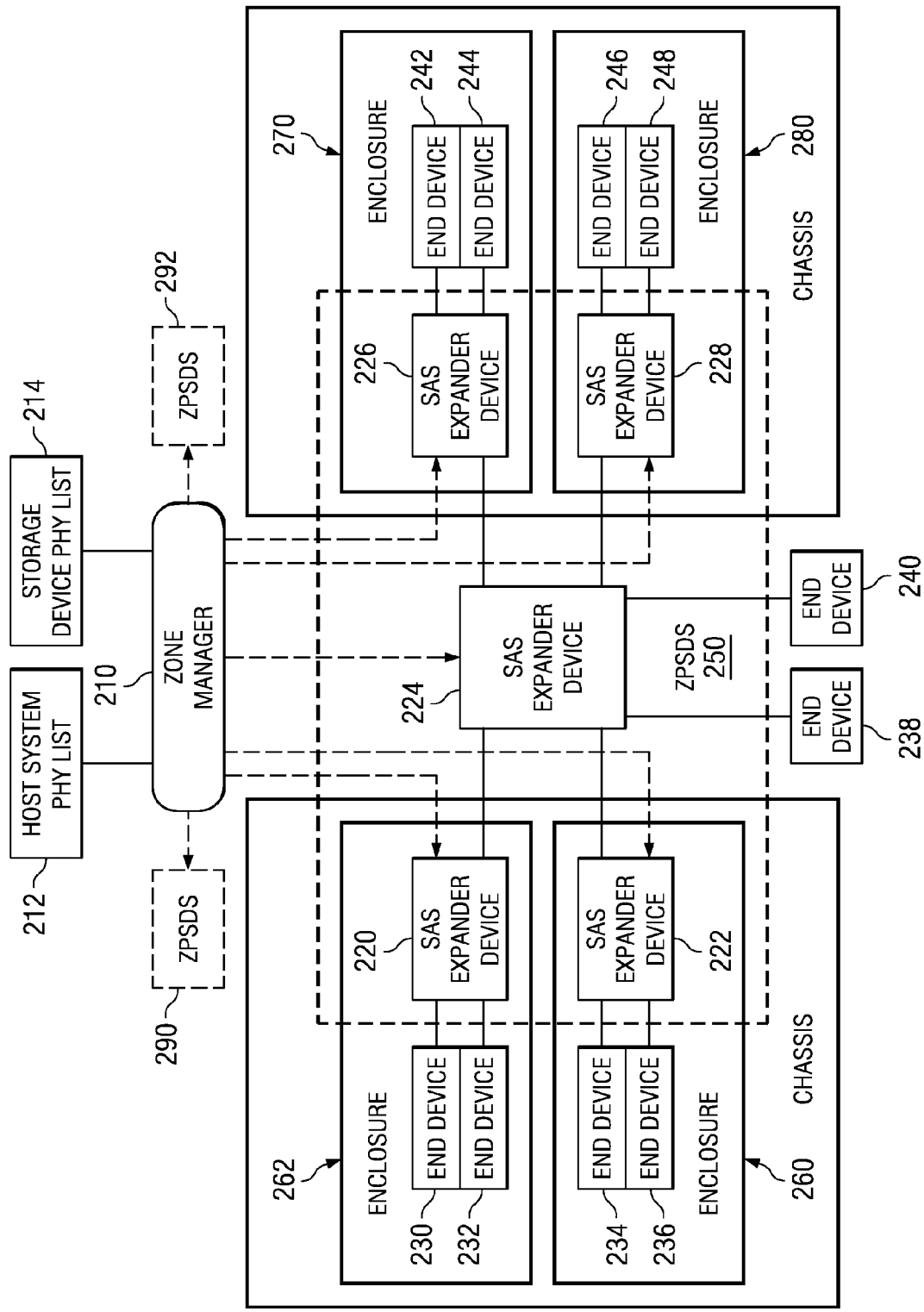
FIG. 2 is an exemplary diagram illustrating a SAN in which a zone manager and serial attached SCSI (SAS) expanders are utilized in accordance with one illustrative embodiment.

FIG. 2 is an exemplary diagram illustrating a SAN in which a zone manager and SAS expanders are utilized in accordance with one illustrative embodiment. There are a number of possible configurations for a SAS based SAN with the depicted implementation being only one example. In the depicted example, the zone manager communicates directly with the SAS expander devices, however this is not a requirement. For example, the zone manager may be coupled to an end device through which the zone manager may communicate with the SAS expanders. Furthermore, the zone manager may communicate to each of the SAS expanders through another SAS expander and an end device. Thus, the zone manager may have access to an end device with a SAS port, or phy, whose zone group has access to zone group 2, as discussed hereafter, or may have access to one or more SAS expander devices through a sideband interface, e.g., Ethernet or the like. Other configurations may be used with the mechanisms of the illustrative embodiments without departing from the spirit and scope of the present invention.

As shown in FIG. 2, the zone manager 210, which may be provided in a SAS subsystem of one of the chassis or a different chassis than those shown in FIG. 2, communicates with a plurality of SAS expander devices 220-228 which are in turn coupled to SAS end devices 230-248. The SAS end devices 230-248 may be provided in enclosures 260-280 of storage systems, such as storage systems 180-190 in FIG. 1, for example. The storage systems 180-190 may, or may not, have associated storage system controllers, such as RAID controllers or the like, provided in associated SAS subsystems, that control the transfer of data to/from the end devices 230-248 via the SAS expander devices 220-228. The SAS expander devices 220-228 may be part of a zoned portion of a service delivery subsystem (ZPSDS) 250. The SAN structure may comprise a plurality of such ZPSDS 250, 290, and 292, having the same or different configurations of SAS expanders. Moreover, there may be multiple zone managers 210, such as one for each ZPSDS 250, 290, and 292.

The zone manager 210 assigns zone groups to all the ports, or phys, that are capable of participating in connections through the ZPSDS 250. Every phy in a SAS domain may be assigned to a zone group. In the current SAS-2 specification, there is support for 128 zone groups numbered 0 through 127, although the present invention is not limited to 128 zone groups in order to operate properly. Zone group numbers are assigned to SAS expander devices 220-228 phys as part of the zone phy information and are assigned to SAS addresses in the SAS expander routing table data structures, described hereafter.

Each phy of a SAS expander device 220-228 supports the following zone phy information: an "inside ZPSDS" bit, a "requested inside ZPSDS" bit, an "inside ZPSDS persistent" bit, a "zone group persistent" bit, and a "zone group" field. The "inside ZPSDS" bit indicates if the phys is inside or on the boundary of a ZPSDS 250. An "inside ZPSDS" bit set to zero indicates that the phy is attached to an end device, a SAS expander device that does not support zoning, or a SAS expander device with zoning disabled. An "inside ZPSDS" bit set to one indicates that the phy is attached to a SAS expander device with zoning enabled and is thus, inside a ZPSDS 250. The "inside ZPSDS" bit is not directly changeable and only changes following a link reset sequence based on the "requested inside ZPSDS" bit, which is used to establish the boundary of the ZPSDS 250.

The "requested inside ZPSDS" bit is transmitted in an IDENTIFY address frame to the attached phy and is used to determine the values of other zone phy information fields after a link reset sequence. The "inside ZPSDS persistent" bit indicates the method used to determine the value of the "inside ZPSDS" bit after a link reset sequence and is transmitted in the IDENTIFY address frame. The "zone group" field contains a value in the range of 0 to 127 that specifies the zone group to which the phy belongs. More information about this zone phy information and the use of this information in a SAS based system may be found in the SAS-2 specification.

In accordance with the SAS-2 specification, a SAS expander device 220-228 phy inside a ZPSDS 250 is assigned to zone group 1. A phy attached to the boundary of the ZPSDS 250, i.e. attached to an SAS expander phy with an "inside ZPSDS" bit set to zero, belongs to the zone group indicated by the zone group field of the SAS expander phy to which it is attached. A phy attached to one or more SAS expander devices beyond the boundary of the ZPSDS 250 belongs to a zone group if a "zone address resolved" bit is set to one in the boundary expander phy and the SAS expander routing table data structure in the SAS expander device contains a "zone group value" for the phy's SAS address. The zone groups assigned in one ZPSDS 250 have no relationships to zone groups assigned in another ZPSDS 290, 292.

Each SAS expander device 220-228 contains a zone permission table data structure that controls whether a connection is allowed between phys based on their zone groups. A requested connection is only established if the zone permission table indicates that access between the zone group of the source port, or phy, and the zone group of the target port, or phy, is allowed.

FIG. 3 is an exemplary table representing the various possible zone groups to which SAN devices may be associated in accordance with one illustrative embodiment. The zone groups illustrated in the table of FIG. 3 are identical to the zone groups specified in the SAS-2 specification. As shown in FIG. 3, zone groups 0-3 have special meaning, zone groups 4 to 7 are reserved, and zone groups 8-127 are generally used to assign to different phys of the SAS expander devices and the like so as to facilitate communication between devices using zone permission table data structures in the SAS expander devices. Zone group 0 is used to limit access of the phys in this zone group to only the phys in zone group 1. Zone group 1 phys are able to access all other phys in all zone groups. Zone groups 2 and 3 are primarily used for controlling which devices may perform Serial Management Protocol (SMP) management operations.

FIG. 4 is an exemplary diagram of a zone permission table in accordance with one illustrative embodiment. As discussed above, the zone permission table data structures in the SAS expander devices specify access permissions between zone groups. If a bit in the zone permission table data structure is set to one, then connection requests shall be permitted between phys in the zone groups. If a bit in the zone permission table data structure is set to zero, then connection requests between phys in the zone groups shall be rejected. That is, a ZP[s, d] bit set to one specifies that zone group s has permission to access zone group d, whereas a ZP[s, d] bit set to zero specifies that zone group s does not have permission to access zone group d. If ZP[s, d] is set to a particular value, then ZP[d, s] is set to the same value.

The illustrative embodiments provide a zone manager which automatically performs zoning of the devices, or the ports/phys of the devices, in a SAN so that mapping of the zones via the zone permission tables may be performed. As discussed above, typically such zoning must be performed using a manual process. This requires an intimate understanding of the SAS protocol, the architecture of the SAN, and the like. Moreover, the manual configuring of the zones requires an extensive amount of work to accomplish and is error prone due to the inclusion of the human factor. The illustrative embodiments eliminate these problems by performing such zoning automatically. By automating the zoning of the devices in the SAN, users and customers that do not necessarily have a detailed knowledge of the storage devices or SANs may configure the SAN even if it utilizes a complex and large architecture.

At the start of the zoning operation, the zone manager, e.g., zone manager 210 of FIG. 2 associated with a ZPSDS 250 in a SAN, generates a list of ports, or phys, on the SAN, e.g., phys of the SAS expander devices 220-228, such as through a discovery process, such as previously described. As discussed above, this discovery process may comprise standardized discovery operations such as described in the SAS-2 specification as well as a chassis position identification discovery process. During generation of this list of ports, or phys, the zone manager 210 determines which phys are associated with end devices, i.e. storage devices or host system devices, that provide data storage, i.e. storage devices, whose ports/phys are associated with host systems, e.g., host servers 110-120 in FIG. 1, that provide access to the data on the storage devices, whether there are storage system controllers, e.g., RAID controllers 146 and 156 in FIG. 1, present in association with the end devices, and other hardware details. Therefore, a listing of host system ports/phys 212 and storage device ports/phys 214 are both automatically available at the start of the operation of the mechanisms of the illustrative embodiments. Additional information is available within the details of each port/phy in each list. For example, the details for each port/phy may identify whether the port/phy is associated with a storage device that is part of an external Switched Bunch of Disks (SBOD) system, an internal SBOD, an internal Just a Bunch of Disks (JBOD) system, or the like, with regard to each chassis in the SAN.

Figure 5:
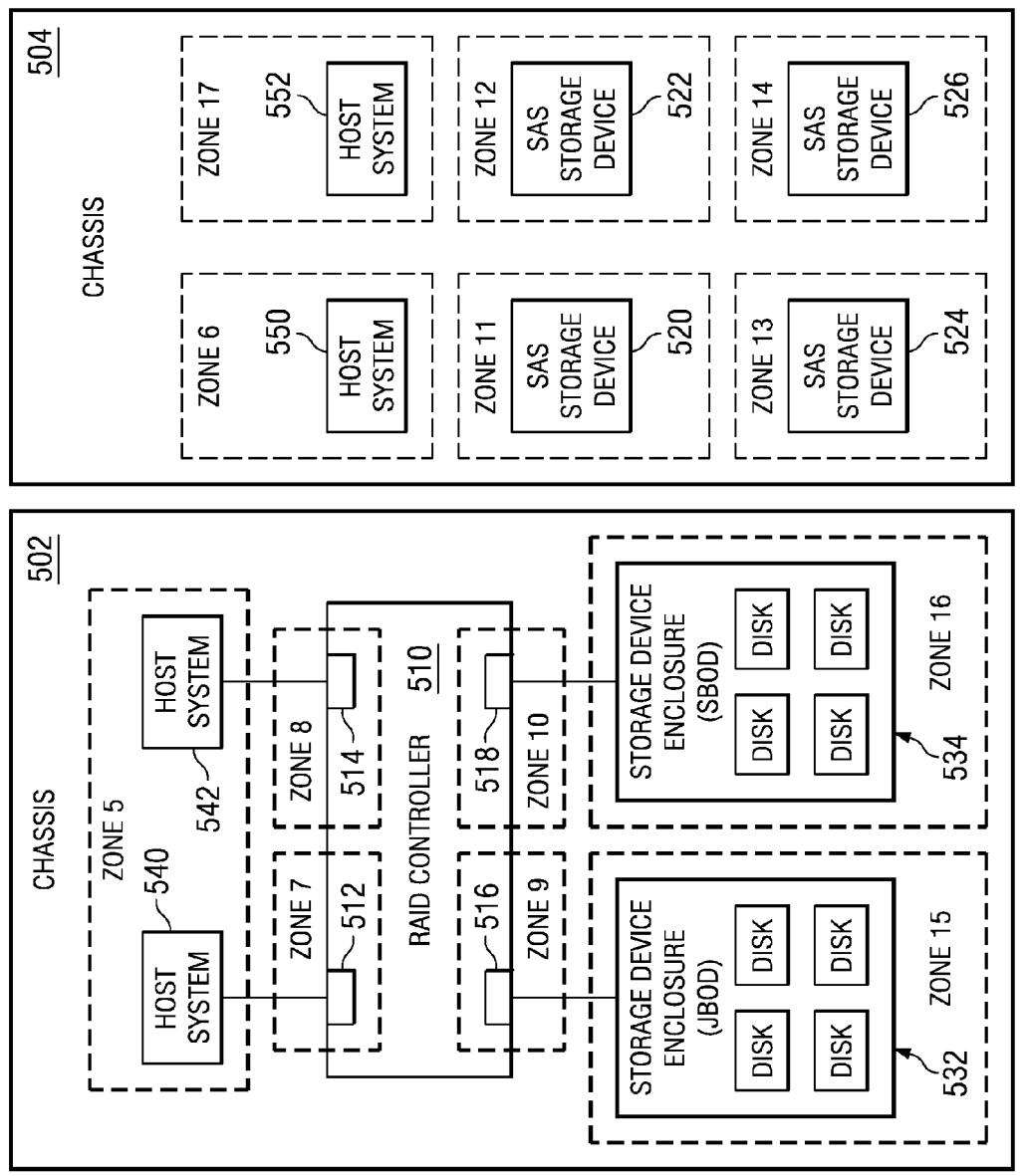
FIG. 5 is an exemplary diagram illustrating a zoning operation in accordance with one illustrative embodiment.

FIG. 5 is an exemplary diagram illustrating a zoning operation in accordance with one illustrative embodiment. This zoning operation is performed based on the listing of host system ports/phys 212 and storage device ports/phys 214 in FIG. 2. When the zone operation starts, the zone manager, e.g., zone manager 149 in FIG. 1 or 210 in FIG. 2, assigns all host systems, e.g., servers, within a chassis to the same zone group. Thus, in FIG. 5, within chassis 502, the host systems 540 and 542 are assigned to zone group 5. Within chassis 504, the host systems 550 and 552 are initially assigned to zone group 6, but as discussed hereafter, may be reassigned into their own zone groups 6 and 17, respectively.

The zone manager then assigns each storage system controller, e.g., RAID controller or the like, in the chassis to a particular zone group such that the ports/phys of the front end of the storage system controller have an additional zone group. Thus, for example, the front end ports/phys 512-514 of the RAID controller 510 are assigned to their own zone groups, e.g., zone groups 7 and 8 in the depicted example. If the backend ports/phys of the storage system controllers, e.g., ports/phys 516-518 of RAID controller 510, are on the same SAN as the front end ports/phys 512-514, the backend ports/phys 516-518, are also assigned to their own particular zone group. Thus, in the depicted example, ports/phys 516-518 are assigned to zone groups 9 and 10.

The zone manager then determines, for each storage system 520-526, 532 and 534, in the storage system phy list, if there is a storage system controller, e.g., RAID controller 510, in the same chassis 502 or 504 associated with the storage system, or not. If there is no storage system controller in the same chassis as the storage systems 520-526, 532 and 534, then each storage device is assigned its own zone group. Thus, in the depicted example, the storage devices 520-526 in chassis 504 are each assigned to their own zone group, i.e. zone groups 11-14. Moreover, the host systems 550 and 552 of the chassis 504 are re-assigned to their own zone groups. As a result, host system 550 is in zone group 6, but host system 552 is re-assigned to zone group 17.

If there is a storage system controller, e.g., RAID controller 510, then the storage devices in each enclosure 532 and 534, e.g., storage device drawer, are mapped to a separate zone group. Thus, in the depicted example, enclosures 532-534 are each assigned to their own separate zone group, i.e. zone group 15 and zone group 16. These various zone groups are then used by the zone manager to map the host systems 540, 542, 550, and 552, e.g., the host servers, to the storage devices, e.g., 520-526, 532, and 534, by adding to the zone permissions table data structures for the zone groups, in the corresponding SAS expanders of the SAS subsystems and storage subsystems, the storage system zone groups.

These various zone groups are further utilized to map storage device enclosures and storage devices to storage system controllers in accordance with a defined algorithm. The mapping of storage device enclosures or storage devices may be performed in a different manner depending upon the type of storage device enclosure. For example, one type of mapping algorithm may be used for Just a Bunch of Disks (JBOD) enclosures or storage devices while another type of mapping may be used for Switched Bunch of Disk (SBOD) enclosures or storage devices. For example, the zone manager may determine, for each JBOD enclosure zone group of a chassis, such as zone group 15, whether there is a storage system controller, e.g., RAID controller 510, in the same chassis, e.g., chassis 502, as the enclosure zone group. If so, the zone manager may map the JBOD enclosure, e.g., enclosure 532, to the storage system controller, e.g., RAID controller 510, in the chassis with the fewest mappings of enclosures/storage devices.

Thus, in FIG. 5, if there were a second RAID controller in chassis 502, a determination would be made between this second RAID controller and the depicted RAID controller 510 to determine which has the lowest number of mappings in order to determine to which RAID controller the JBOD enclosure zone group 15 should be mapped. This determination may be performed, for example, by analyzing the zone permissions tables of the SAS expanders of the various enclosures 532 and 534 and the SAS subsystem to determine a total number of mappings to zones 9 and 10 in these zone permissions tables. Alternatively, as mappings are added to the zone permissions tables, for the various zones established by the zone manager, the zone manager may maintain a count of mappings to each of the storage system controller phy zones. In this way, the zone manager may quickly determine to which storage system controller a JBOD enclosure zone group should be mapped.

If there is a tie of the storage system controllers having the fewest mappings, the storage system controller to which the JBOD enclosure zone group is mapped is selected randomly, or pseudo-randomly, or by some other mechanism. Thereafter, if there are any additional JBOD enclosures that are unassigned to a storage system controller, i.e. JBOD enclosures that are external to the chassis 502 and not associated with another chassis, these JBOD enclosures are iteratively mapped to the storage system controller with the fewest mapped enclosures.

With regard to SBOD storage devices, each host system 540 and 542, e.g., server, in a chassis is provided with an equal assignment of SBOD storage devices, such as disks in enclosure 534, within the same chassis 502. If there are an unequal number of SBOD storage devices, then the host systems 540 and 542 that are assigned additional SBOD storage devices are chosen using an arbitrary method that may be tailored for a specific application. For example, the host systems 540 and 542 that are assigned additional SBOD storage devices may be chosen randomly or pseudo-randomly. It should be noted that SBOD storage devices are handled differently in this exemplary embodiment because JBOD storage devices cannot be individually allocated since the SAN fabric is connected to a loop of storage devices rather than the SAN fabric being directly connected to the storage devices, as in the case of SBOD storage devices.

For SBOD storage devices external to the chassis (not shown), each host system 540 and 542 is provided with an equal allotment of the SBOD storage devices. If there are an unequal number of SBOD storage devices, the host systems 540 and 542 that are assigned additional SBOD storage devices are chosen using an arbitrary method that may be tailored for the specific application. Again, these host systems 540 and 542 may be selected using a random, or pseudo-random methodology, for example.

In performing the mappings described above, what is meant is that the zone permissions table data structures of the SAS expanders associated with the various enclosures, the SAS subsystems, or the like, or zone permissions table data structures maintained in the zone manager, are updated to include permissions for one zone to communicate with another zone, i.e. a mapping, or vice versa. These zone permission table data structures may then be used to permit communication from one port to another, or one phy to another, within the SAN. Thus, the mechanisms of the illustrative embodiments provide an automated mechanism for configuring the zones of a SAN in order to provide such communication connections. Therefore, much of the manual work and sources of error is eliminated by virtue of the automated mechanism of the illustrative embodiments.

It should be appreciated that once the zoning of the SAN is performed in the manner described above, or even during the zoning operation described above, the mappings that are established in the zone permissions table data structure may be modified based on attributes and capabilities of the SAN devices, e.g., blades, storage devices, storage enclosures, storage controllers, and the like. Moreover, such zone permissions table data structure mappings may be modified to establish pairs of SAN devices in order to avoid a single point of failure.

Since SAN devices may be provided by various different providers, it is probable that SAN devices will have different attributes and capabilities. Thus, the automatic zoning of the illustrative embodiments may need to take into account these different attributes and capabilities when performing automatic zoning of the SAN. In order to adjust or modify the zoning previously described, it is first necessary to obtain the attribute and capability information for the SAN devices so that such modification may be performed. Such attribute and capability information may be obtained, for example, from a chassis management module associated with the SAN devices which may store or otherwise access this information, such as from the vital product data (VPD) associated with/provided by the SAN devices. Alternatively, each SAS-based SAN device type may have an associated unique SAS address range that can be used to identify the attributes and capabilities of the SAN device. A lookup of the SAS address range is possible, since address ranges are given by a standards group to each device vendor and this range is fixed. Thus, look-up may even be embedded within an application. A more general but involved lookup of the SAS address may be performed with regard to a third party, such as via a central or distributed database over a data network, to obtain such attribute and capability information. The information gathering on the attributes and capabilities of the SAN devices may be performed as part of the VPD access and discovery operations discussed above, or as part of a subsequent operation after the zoning described previously is performed, for example.

A plethora of various types of modifications to the mappings in the zone permissions table data structure may be made depending upon the type of SAN devices, the attributes of the SAN devices, the capabilities of the SAN devices, and the like, not all of which can be detailed herein. One example of a modification that may be performed is based on whether or not a particular SAN device supports multi-path communication, such as multi-path RAID communication capabilities, or not. Some blades support multi-path communication while others do not. Thus, the particular zone to which a blade is mapped may be dependent upon whether that blade requires multi-path communication or not. It may be detrimental to map a blade that does not support multi-path communication to a zone that provides such multi-path communication. Thus, if through the default zoning operation described previously, a non-multi-path blade is mapped to a zone that provides multi-path communication, then the mappings may be modified to map that blade to a different zone, provide that blade with its own zone, such as on a switch or associated with a storage controller, to which mappings may be performed, or the like.

As another example, storage capacity of a SAN storage device, such as a JBOD or SBOD, may be used as a basis for modifying zone mappings in the zone permissions table data structure. For example, the storage capacity may be a limiting factor for the number of host systems that may be mapped to that SAN storage device. Thus, once this limit is met, the host system mappings to the zone of that SAN storage device may need to be modified so as not to exceed the limit.

Moreover, the number of hosts that may be mapped to a particular SAN storage device may be limited based on licensing and other formal agreements. The VPD information, or the information retrieved based on the SAS address, for example, may specify a licensing limit on the number of host systems that may be supported by each SAN storage device. For example, one SAN storage device may have a license permitting 13 host systems to access or utilize that SAN storage device, while another SAN storage device may have a license permitting 64 host systems to access or utilize it. Such agreement-based limits may be identified in the attributes and capabilities information retrieved for each of the SAN devices and may be used by the logic in the zone manager to adjust or modify the mappings in the zone permissions table data structure.

With particular application to SAS, it is notable that SAS is unique in that it is pluggable with Serial Advanced Technology Attachment (SATA) storage devices. This is because with SAS, a SATA tunneling protocol may be utilized to communicate with SATA storage devices, which tend to be lower cost storage devices than other alternatives but provide lower performance. Thus, while SATA storage devices are beneficial to have in a system for such uses as backup storage or secondary storage and the like, they are not well suited for other uses, such as primary storage devices.

During discovery of the SAN devices, the identity of a SAN device as a SATA storage device may be discovered and used to adjust or modify the zone mappings in the zone permissions table data structure. For example, the zone manager may adjust or modify mappings to SATA storage devices such that they are limited to being used as backup storage or secondary storage, require that they be controlled by a RAID controller via mapping to zones associated with a RAID controller, preclude them from being mapped to RAID controllers, or the like.

Moreover, it should be appreciated that the zone manager may identify SAN devices to be paired for purposes of redundancy in the event of a failure. That is, the zone manager may adjust or modify the mapping of zones in the zone permissions table data structure to ensure that there is a redundant SAN device, e.g., SAN storage device, for a given SAN device. That is, for example, the same host may be mapped to two SAN storage devices such that one SAN storage device may take over operations for the other SAN storage device in the event of a failure.

It should be appreciated that the above examples are not exhaustive of the possible adjustments or modifications to the zone mappings in the zone permissions table data structure(s) that may be performed based on the various attribute and capability information. Any adjustment and/or modification of zone mappings in a zone permissions table data structure based on attribute and capability information of SAN devices is intended to be within the spirit and scope of the illustrative embodiments. The logic of the zone manager provides the decision making ability and functionality for determining when and where to modify or adjust the zone mappings in the zone permissions table data structure(s) in order to achieve a desired configuration of the SAN based on the attributes and capabilities of the SAN devices. In this way, a fully configured SAN is achieved in an automated manner without requiring user input to perform the zoning or modifications to the zoning, although user input could be received and used as a basis for initiating and/or guiding the modification or adjustment of the zone mappings in the zone permissions table data structure(s).

Figure 6:
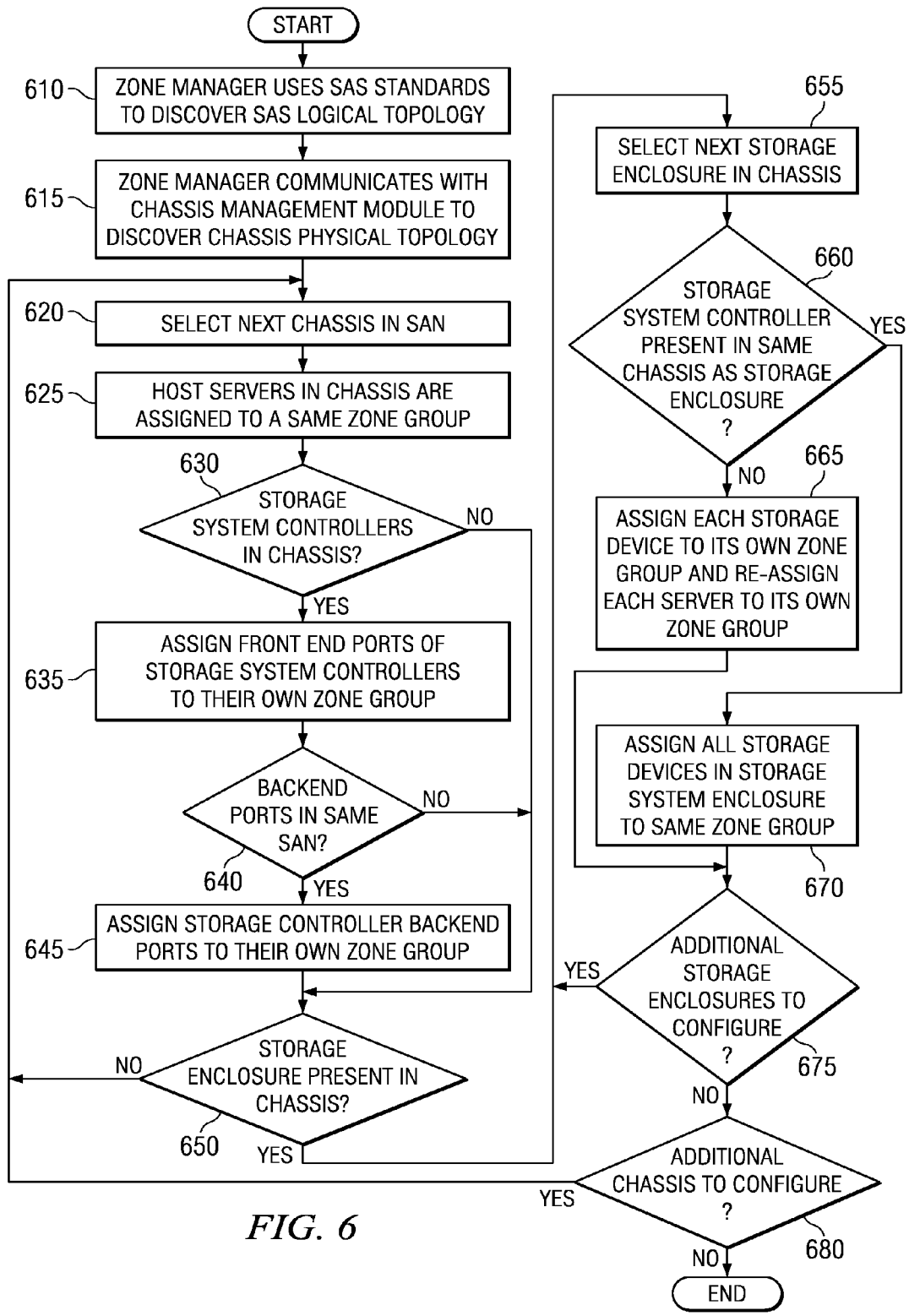
FIG. 6 is a flowchart outlining an exemplary operation for assigning zone group identifiers to devices of a SAN in accordance with one illustrative embodiment.
Figure 7:
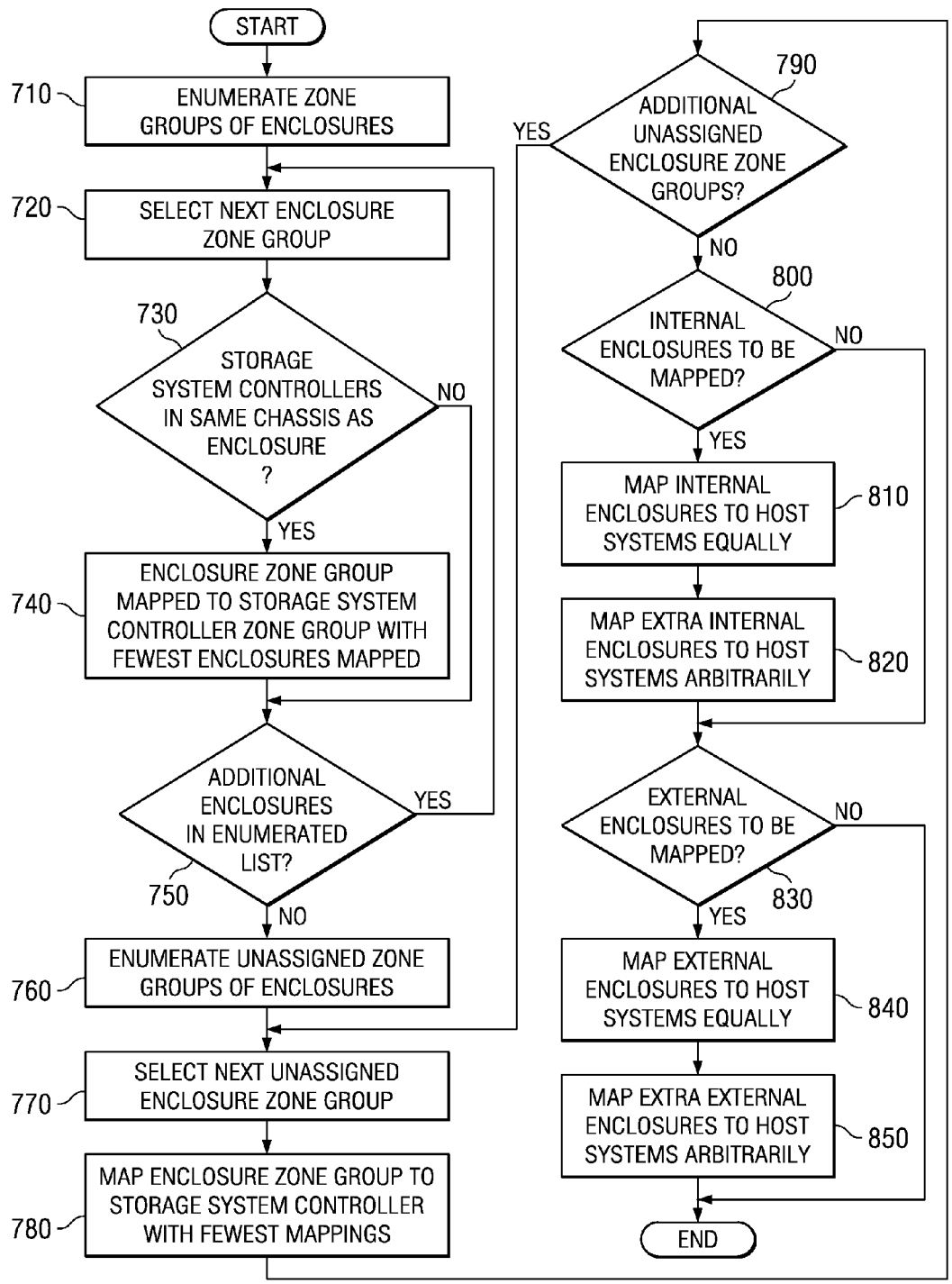
FIG. 7 is a flowchart outlining an exemplary operation for mapping zone groups in accordance with one illustrative embodiment.

FIGS. 6 and 7 provide flowcharts outlining exemplary operations for assigning zone groups and mapping zone groups in accordance with one illustrative embodiment. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

FIG. 6 is a flowchart outlining an exemplary operation for assigning zone group identifiers to devices of a SAN in accordance with one illustrative embodiment. The operation outlined in FIG. 6 is used by the zone manager to assign zone group identifiers to each of the host systems, based on the chassis in which they are present, and the storage systems such that the zone group assignments may be later used to update zone permissions table data structures of the SAS expander in the various zone groups with mappings of zone groups to one another.

As shown in FIG. 6, the operation starts with the zone manager performing discovery operations using SAS standards to discover the logical topology of the SAS based SAN (step 610). The zone manager then performs discovery of the physical topology by communication with the chassis management module to discover, for example, the location of host servers, storage controllers, storage subsystems, SAS subsystems, and the like (step 615). From steps 610 and 615, a listing of the host system and storage system phys/ports may be obtained and used to perform the zoning operations hereafter.

The zone manager selects the next chassis in the SAN (step 620). Each of the host servers or host systems in the selected chassis are assigned to a zone group (step 625). The zone manager determines whether there are storage system controllers in the chassis (step 630). If so, for each storage system controller, each of the front end ports of the storage system controller are assigned to their own zone group (step 635) and a determination is made as to whether the backend ports of the storage system controller are in the same SAN (step 640). If so, then for each storage system controller, each of the backend ports are assigned to their own zone group (step 645).

Thereafter, if there are no storage system controllers in the chassis, or if the backend ports are not in the same SAN, the zone manager determines if there are storage enclosures present in the chassis (step 650). If no storage enclosures are present, the operation returns to step 620. If there are storage enclosures present in the chassis, the zone manager selects the next storage enclosure in the chassis (step 655) and determines whether a storage system controller is present in the same chassis as the storage enclosure (step 660). If there is no storage system controller in the chassis, then the storage devices of the storage system are each assigned their own zone group by the zone manager and each host server is re-assigned to its own zone group (step 665). If there is a storage system controller, then all of the storage devices in the storage system's enclosure are assigned to a same zone group (step 670).

Thereafter, the zone manager determines if there are additional storage enclosures in the chassis to configure (step 675). If so, the operation returns to step 655. If there are no additional storage enclosures to configure, the zone manager determines if there are additional chassis to configure (step 680). If so, the operation returns to step 620. Otherwise, the operation terminates.

FIG. 7 is a flowchart outlining an exemplary operation for mapping zone groups in accordance with one illustrative embodiment. The operation outlined in FIG. 7 is used by the zone manager to map all of the zone groups for the host systems or servers to the zone groups of all of the storage devices in the SAN. As shown in FIG. 7, the operation starts with the zone manager enumerating the zone groups for the storage enclosures to thereby generate an enumerated list of storage enclosure zone groups (step 710). A next storage enclosure zone group in the enumerated list is selected (step 720), and a determination is made as to whether there is a storage system controller in the same chassis as the storage enclosure zone group (step 730). If so, then the storage enclosure associated with the currently selected storage enclosure zone group is mapped to the storage system controller zone group, in the chassis, that has the fewest storage enclosure zone group mappings (step 740). In the case of a tie, the particular storage system controller zone group that is selected to which the storage enclosure is mapped is selected in a random or pseudo-random manner.

Thereafter, or if there is no storage system controller in the same chassis as the storage enclosure of the currently selected zone group, a determination is made as to whether there are additional storage enclosure zone groups to configure in the enumerated list (step 750). If so, the operation returns to step 720. If not, zone groups for remaining unassigned storage enclosures are again enumerated (step 760). The next storage enclosure zone group in this enumerated list is then selected (step 770) and is mapped to a storage system controller in the SAN that has the fewest mappings (step 780). Again, any ties may result in a random or pseudo-random selection of a storage system controller to which the storage enclosure is mapped. A determination is made as to whether there are additional unassigned storage enclosure zone groups (step 790). If so, the operation returns to step 770.

If there are no additional storage enclosure zone groups to map, a determination is made as to whether there are any internal storage devices, i.e. internal to a chassis, to be mapped (step 800). If there are any internal storage devices to be mapped, they are mapped equally to each of the host systems within the same chassis (step 810). Any extra internal storage devices, such as when there is an unequal number of internal storage devices, are then mapped to the host systems of the same chassis in an arbitrary manner (step 820).

Thereafter, or if there are no additional internal storage devices to be mapped, a determination is then made as to whether there are any external storage devices, i.e. external to a chassis, to be mapped (step 830). If there are any external storage devices to be mapped, they are mapped equally to each of the host systems of the SAN (step 840). Any extra external storage devices, such as when there is an unequal number of external storage devices, are then mapped to the host systems in an arbitrary manner (step 850). The mapping operation then terminates.

Having mapped the zone groups of the host systems, the zone groups of the storage systems, and the like, these mappings may be used to control the establishment of communication connections from one port or phy to another. Thus, the illustrative embodiments provide a mechanism for automating the zoning of a SAN and performing mapping of zones, such as by populating zone permissions table data structures of the zone groups as may be maintained in the SAS expanders of the SAN. In this way, the burden and possible source of error found in the known manual process for performing configuring of zones in a SAN are eliminated.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer useable storage medium having a computer readable program stored thereon, wherein the computer readable program, when executed on a zone manager in a Serial Attached SCSI (SAS) protocol subsystem of a storage area network (SAN), causes the zone manager to:
   automatically assign a host system of a chassis, in a storage area network (SAN) implementing a zoning protocol which comprises grouping and mapping components, to a first zone group of the SAN;
   automatically assign a second zone group of the SAN to a plurality of SAS storage devices in the chassis; and
   automatically map the assigned first zone group and the second zone group to each other such that the host system is mapped to the plurality of SAS storage devices by automatically updating a zone permissions table associated with one or more SAS expanders of the SAN, wherein communication between the host system and the plurality of SAS storage devices is controlled based on the mapping of the assigned first zone group to the assigned second zone group;
   wherein the computer readable program causes the zone manager to automatically map the assigned first zone group and the second zone group to each other by:
   enumerating zone groups of storage device enclosures within the chassis to thereby generate an enumerated list;
   determining, for each storage device enclosure zone group in the enumerated list, whether a storage system controller is present in a same chassis as a storage device enclosure of the storage device enclosure zone group; and
   mapping the storage device enclosure zone group to a storage system controller zone group having a smallest number of storage device enclosure zone groups mapped to it.

2. The computer program product of claim 1, wherein the SAN comprises a plurality of host systems and a plurality of storage devices, and wherein the computer program product is executed with regard to each of the host systems and each of the storage devices such that each of the plurality of host systems is mapped to each of the plurality of storage devices.

3. The computer program product of claim 1, wherein the computer readable program further causes the zone manager to:
   determine whether the chassis has an associated storage system controller;
   assign front end ports of the storage system controller to at least one third zone group responsive to a determination that the chassis has an associated storage system controller;
   determine whether backend ports of the storage system controller are in a same SAN as the front end ports; and
   assign the backend ports of the storage system controller to at least one fourth zone group responsive to a determination that the backend ports are in the same SAN as the front end ports.

4. The computer program product of claim 1, wherein the computer readable program further causes the zone manager to automatically assign the second zone group to the storage device by:
   determining whether there is a storage device enclosure present in the chassis;
   determining whether a storage system controller is present in the same chassis as the storage device enclosure; and assigning all of the storage devices in the storage device enclosure to a fifth zone group responsive to a determination that a storage system controller is present in the chassis.

5. The computer program product of claim 4, wherein the computer readable program further causes the zone manager to automatically assign the second zone group to the SAS storage device by:

assigning each storage device in the storage device enclosure to its own storage device zone group and re-assigning each host system to its own host system zone group responsive to a determination that there is not a storage system controller in the chassis.

6. The computer program product of claim 1, wherein the computer readable program further causes the zone manager to automatically map the assigned first zone group and the second zone group to each other by:

mapping storage device enclosure zone groups internal or external to the chassis equally to host systems of the SAN.

7. The computer program product of claim 1, wherein the computer readable program further causes the zone manager to automatically map the assigned first zone group and the second zone group to each other by:

enumerating unassigned storage device enclosure zone groups to generate an enumerated list; and iteratively mapping the storage device enclosure zone groups to storage system controller zone groups having a smallest number of storage device enclosure zone groups mapped to them.

8. The computer program product of claim 1, wherein the chassis is a blade system chassis having one or more blades provided in one or more bays of the blade system chassis.

9. The computer program product of claim 1, wherein the computer program product is executed automatically by the zone manager in response to one of initialization of the SAN or addition of a new SAN device to the SAN.

10. The computer program product of claim 1, wherein the computer readable program further causes the zone manager to:

retrieve attribute information for at least one of the host system or the SAS storage device; and modify the mapping in the zone permissions table data structure based on the attribute information.

11. The computer program product of claim 10, wherein the attribute information identifies a capability of the host system or storage device, and wherein the mapping in the zone permissions table data structure is modified to limit mappings associated with the host system or storage device based on the capability.

12. A zone manager system, in a Serial Attached SCSI (SAS) protocol subsystem of a storage area network (SAN), comprising:

a processor; and a memory coupled to the processor, wherein the memory comprises instructions which, when executed by the processor, cause the processor to:

automatically assign a host system of a chassis, in the SAN implementing a zoning protocol which comprises grouping and mapping components, to a first zone group of the SAN;

automatically assign a second zone group of the SAN to a SAS storage device in the chassis; and automatically map the assigned first zone group and the second zone group to each other such that the host system is mapped to the SAS storage device by automatically updating a zone permissions table associated with one or more SAS expanders of the SAN, wherein communication between the host system and the SAS storage device is controlled based on the mapping of the assigned first zone group to the assigned second zone group, wherein the zone manager system automatically maps the assigned first zone group and the second zone group to each other by:

enumerating zone groups of storage device enclosures within the chassis to thereby generate an enumerated list;

determining, for each storage device enclosure zone group in the enumerated list, whether a storage system controller is present in a same chassis as a storage device enclosure of the storage device enclosure zone group; and mapping the storage device enclosure zone group to a storage system controller zone group having a smallest number of storage device enclosure zone groups mapped to it.

13. The system of claim 12, wherein the SAN comprises a plurality of host systems and a plurality of storage devices, and wherein the computer program product is executed with regard to each of the host systems and each of the storage devices such that each of the plurality of host systems is mapped to each of the plurality of storage devices.

14. The system of claim 12, wherein the zone manager system:

determines whether the chassis has an associated storage system controller;

assigns front end ports of the storage system controller to at least one third zone group responsive to a determination that the chassis has an associated storage system controller;

determines whether backend ports of the storage system controller are in a same SAN as the front end ports; and assigns backend ports of the storage system controller to at least one fourth zone group responsive to a determination that the backend ports are in the same SAN as the front end ports.

15. The system of claim 12, wherein the zone manager system automatically assigns the second zone group to the SAS storage device by:

determining whether there is a storage device enclosure present in the chassis;

determining whether a storage system controller is present in the same chassis as the storage device enclosure; and assigning all of the storage devices in the storage device enclosure to a fifth zone group responsive to a determination that a storage system controller is present in the chassis.

16. The system of claim 12, wherein the zone manager system automatically maps the assigned first zone group and the second zone group to each other by:

enumerating unassigned storage device enclosure zone groups to generate an enumerated list; and iteratively mapping the storage device enclosure zone groups to storage system controller zone groups having a smallest number of storage device enclosure zone groups mapped to them.

17. The system of claim 12, wherein the zone manager system operates in response to one of initialization of the SAN or addition of a new SAN device to the SAN to automatically assign the first zone group, automatically assign the second zone group, and map the first zone group to the second zone group.

18. A method, in a zone manager in a Serial Attached SCSI (SAS) protocol subsystem of a storage area network (SAN), for automatically configuring zones of the SAN, the SAN comprising one or more host systems and one or more storage devices, comprising:
   automatically assigning a host system of a chassis, in the SAN implementing a zoning protocol which comprises grouping and mapping components, to a first zone group of the SAN;
   automatically assigning a second zone group of the SAN to a SAS storage device in the chassis; and
   automatically mapping the assigned first zone group and the second zone group to each other such that the host system is mapped to the SAS storage device by automatically updating a zone permissions table associated with one or more SAS expanders of the SAN, wherein communication between the host system and the SAS storage device is controlled based on the mapping of the assigned first zone group to the assigned second zone group,
   wherein automatically assigning the second zone group to the SAS storage device further comprises:
   enumerating zone groups of storage device enclosures within the chassis to thereby generate an enumerated list;
   determining, for each storage device enclosure zone group in the enumerated list, whether a storage system controller is present in a same chassis as a storage device enclosure of the storage device enclosure zone group; and
   mapping the storage device enclosure zone group to a storage system controller zone group having a smallest number of storage device enclosure zone groups mapped to it.

19. The method of claim 18, further comprising:
   determining whether the chassis has an associated storage system controller;
   assigning front end ports of the storage system controller to at least one third zone group responsive to a determination that the chassis has an associated storage system controller;
   determining whether backend ports of the storage system controller are in a same SAN as the front end ports; and
   assigning backend ports of the storage system controller to at least one fourth zone group responsive to a determination that the backend ports are in the same SAN as the front end ports.

20. The method of claim 18, wherein automatically assigning the second zone group to the storage device further comprises:
   determining whether there is a storage device enclosure present in the chassis;
   determining whether a storage system controller is present in the same chassis as the storage device enclosure; and
   assigning all of the storage devices in the storage device enclosure to a same fifth zone group responsive to a determination that a storage system controller is present in the chassis.

21. The method of claim 18, wherein automatically mapping the assigned first zone group and the second zone group to each other further comprises:
   storing a mapping of the first zone group with the second zone group in a zone permissions table data structure associated with at least one of the host system or the SAS storage device;
   retrieving attribute information for at least one of the host system or the SAS storage device; and
   modifying the mapping in the zone permissions table data structure based on the attribute information.

* * * * *